United States Patent [19]

Battey

[11] 3,714,790
[45] Feb. 6, 1973

[54] APPARATUS AND METHOD FOR HANDLING VOLATILE LIQUIDS

[75] Inventor: Robert F. Battey, Upland, Calif.

[73] Assignee: FMC Corporation, San Jose, Calif.

[22] Filed: April 13, 1971

[21] Appl. No.: 133,638

[52] U.S. Cl. ............................62/54, 55/88, 55/89, 220/85 VR
[51] Int. Cl. ............................................F17c 13/00
[58] Field of Search ..........62/54; 220/85 VR, 85 VS; 55/88, 89

[56] References Cited

UNITED STATES PATENTS

| | | | |
|---|---|---|---|
| 3,266,262 | 8/1966 | Moragne | 62/54 |
| 2,059,942 | 11/1936 | Gibson | 220/85 VR |
| 2,379,215 | 6/1945 | Brinkman | 220/85 VR |
| 2,849,150 | 8/1958 | Tompkins | 220/85 VR |
| 2,765,872 | 10/1956 | Hartman | 220/85 VR |
| 2,947,379 | 8/1960 | Aubrey | 220/85 VR |
| 3,369,371 | 2/1968 | Holly et al. | 62/54 |

Primary Examiner—Meyer Perlin
Assistant Examiner—Ronald C. Capossek
Attorney—F. W. Anderson and C. E. Tripp

[57] ABSTRACT

Hydrocarbon vapors normally released to the atmosphere during the filling of tanks with a relatively volatile liquid are condensed out and recovered as liquid by simultaneously compressing the vapors and saturating the same with vapors of the liquid, followed by a step wherein the compressor effluent is contacted under elevated pressures in a condensation column with a refrigerated stream of the volatile liquid. Said stream is supplied from a relatively small holding tank which is refrigerated and maintained at a relatively constant volume by addition of fresh quantities of the liquid as required.

7 Claims, 1 Drawing Figure

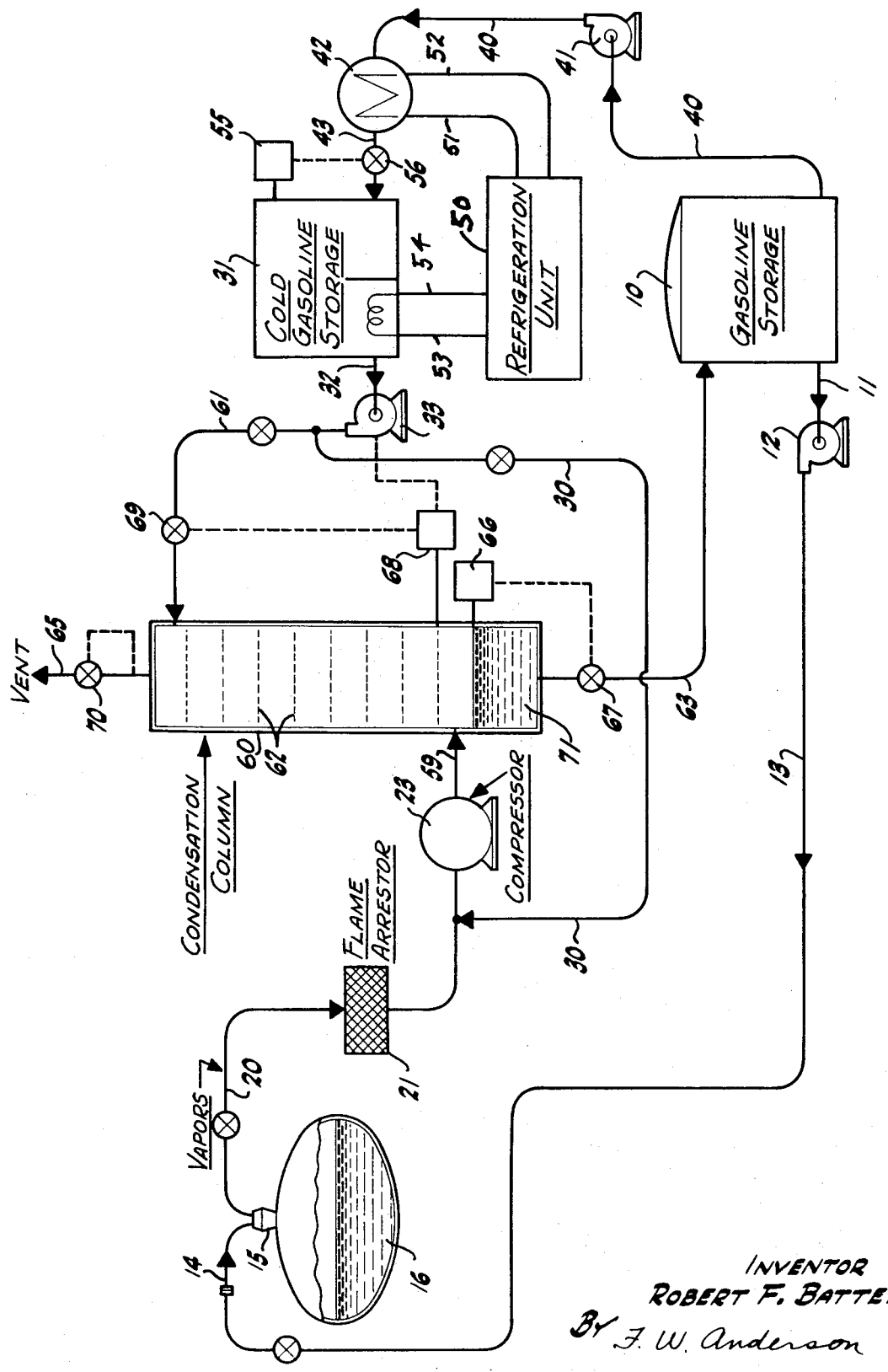

APPARATUS AND METHOD FOR HANDLING VOLATILE LIQUIDS

BACKGROUND OF THE INVENTION

In order to recover condensable vapors from the gaseous stream which is discharged from many tanks as the latter are filled with gasoline or other volatile liquids, resort has commonly been had to the form of apparatus disclosed in U.S. Pat. Nos. 2,765,872 and 2,849,150, wherein the vapors are first collected, then saturated with the liquid vapors to provide a non-explosive mixture and collected under ambient pressures in a large gas-holding tank. The latter tank is sized to receive the vapors at peak tank-loading rates and to discharge the same for processing at a lower, more or less constant rate as gas pressures build up in the tank. The vapor stream so discharged is then compressed and absorbed under elevated pressures as it is contacted with the liquid fuel under ambient temperatures in an absorption column. This gas-holding tank, which must be unusually large so as to receive at ambient pressures the vapors displaced at peak rates during periods of tank loading, is a very expensive item of equipment, and it is an object of this invention to provide a vapor recovery system which is relatively inexpensive and requires no such vapor-holding tank in order to accommodate itself to the processing of vapors as received at peak rates. A further object of the invention is to provide a method and means for preventing the escape into the atmosphere of condensable vapors discharged from tanks as they are loaded with a volatile liquid and for recovering said vapors in the form of condensed liquid.

The nature of still further objects of the invention will be apparent from a consideration of the descriptive portion to follow.

SUMMARY OF THE INVENTION

The present invention relates to a method for recovering hydrocarbon vapors or those of other low boiling organic compounds as said vapors are displaced from tanks during liquid-loading operations, thereby preventing escape of the vapors to the atmosphere. In carrying out the method, vapors exiting from the tank are captured, then saturated and compressed followed by a condensation step wherein the effluent from the compressor is contacted under elevated pressures in a condensation column with a quantity of the gasoline or other volatile liquid being handled which enters said column in a refrigerated condition. The hydrocarbon or other low-boiling vapors present are condensed as well as absorbed by the cold liquid during this contacting step. The residual gaseous portion of the vapor stream recovered from the tank consists essentially of air and is discharged from the condensation column to the atmosphere. The cold liquid stream introduced into said column, now fortified with condensed and absorbed components, leaves the condensation zone at substantially ambient temperatures for storage in an appropriate tank or other vessel such as that from which the liquid being loaded is withdrawn. Preferably the vapor-saturation and compression steps are effected simultaneously by directing the recovered vapors to a compressor along with a stream of the refrigerated liquid, thus further improving the efficiency of the method.

It is a feature of this invention to maintain within the system a relatively small reservoir of refrigerated liquid of substantially the same composition as that being loaded into the receiving tank, thereby permitting the installation and use of refrigeration equipment and of a cold liquid holding reservoir of modest size and cost. The capacity of this refrigerated liquid reservoir is such that, under the pressure and temperature conditions prevailing in the condensation column, vapors collected during an extended period of peak tank-loading operation can readily be processed and recovered using the reserve of refrigerated liquid maintained in the reservoir. This method of operation proves to be far less costly, particularly from a capital investment standpoint, than is that wherein a large vapor-holding tank is incorporated in the system to receive vapors during said peak periods.

The invention can be clearly understood by reference to the appended drawing which is a diagrammatic illustration of a process flow suitable for the practice of the invention in connection with the filling of gasoline storage tanks or tank trucks. However, it is to be understood that the invention is adapted to be used in connection with other volatile liquids which may be combustible or not. In the drawing, no attempt is made to indicate all the pumps, valves and other items of control equipment and the like since the location thereof can readily be supplied by those skilled in the art in the light of the present teachings.

Referring to the drawing, gasoline from a primary storage tank 10 is withdrawn through line 11 and pumped by pump 12 through line 13 to a filler hose 14. Said hose extends through a vapor collecting hood 15 shaped to be fitted into the gasoline receiving opening of a truck or other receiving tank 16. The hood 15 has a vapor receiving line 20 which extends from the hood to a flame arrestor 21 and thence to a compressor 23 which operates only when gasoline is being loaded into tank 16. Along with the vapors, the compressor is supplied with a stream of cold gasoline through line 30, said gasoline being withdrawn from a cold gasoline storage reservoir 31 and supplied to line 30 through an outlet line 32 and a pump 33 which runs when the compressor 23 is actuated. As the vapors pass through the compressor, they also become saturated with the vapors of the liquid, thus producing a non-explosive vapor mixture. The compressor 23, which can be one of the liquid piston type or a liquid-driven ejector compressor, is sized to receive vapors at peak rates of loading tank 16. It can be provided with a speed control (not shown) or other means to permit operation at lower than maximum rates.

The gasoline in reservoir 31 is supplied from the storage tank 10 through line 40, said gasoline being pumped by means of pump 41 through a heat exchanger 42 which cools the gasoline before it is passed through line 43 into said reservoir. A refrigeration unit 50 is connected with said exchanger and withdraws heat therefrom as the refrigerant is passed through lines 51 and 52. Similarly, coolant from the refrigeration unit is passed through lines 53 and 54 into the body of cold gasoline in reservoir 31, thereby providing further cooling of the gasoline therein. The reserve of cold gasoline in the reservoir is kept at a predetermined level by means of a level control 55 which acts to regulate the flow of gasoline in line 43 by controlling the setting of valve 56 in said line. Generally speaking, pump 41 will operate in most instances only when pump 33 and compressor 23 are actuated to process incoming vapors inasmuch as gasoline is pumped into reservoir 31 at about the same rate as it is withdrawn therefrom for passage to the compressor and to a condensation column 60 described below.

The temperature of the refrigerated gasoline in reservoir 31 is maintained at the desired level, usually about 5° to 15° F., by means of a thermostat (not shown) which actuates the refrigeration unit 50 when further cooling of the gasoline in said reservoir is required. Thus, it will be seen that the refrigeration portion of the system operates independently of the others, it being actuated when the temperature of the gasoline in reservoir 31 rises above the proper level either upon long standing or as a result of introducing fresh gasoline to replace that which is pumped to the compressor and to the condensation column.

Returning to the processing of the recovered vapors, the effluent from compressor 23 passes via line 59 to a lower portion of a condensation column 60 operated under moderately elevated conditions or pressure, e.g., about 25 to 85 psig. On entering said column, the liquid component of the compressor effluent falls into a pool 71 of gasoline maintained in the bottom of the column, while the compressed, saturated vapors pass upwardly in counter-current flow to a supply of refrigerated gasoline from reservoir 31 which is pumped by pump 33 through line 61 into the top of the column. The interior of column 60 is fitted with trays 62 which can be of the bubble-cap or other variety whereby good contact is achieved between the rising vapors and the downwardly cascading, refrigerated gasoline stream.

The interrelated conditions of temperature and pressure within column 60 are maintained at such levels that vapors exiting from the column to the atmosphere through a vent line 65 will contain less than 10 percent by weight of hydrocarbon or other vapors of the liquid being loaded. Such vapor exit occurs as pressures build up above the level to be maintained in the column, thereby opening a back-pressure or pressure relief valve 70 in the vent line. For example, when loading gasoline the method of this invention will reduce the hydrocarbon content of the vented stream to a level of approximately 7 percent by weight when the column is operated at a vapor exit temperature of 10° F. and a pressure of 30 psig. The same result can be obtained by increasing the vapor exit temperature to 20° F. while maintaining a column pressure of about 60 to 65 psig, or by using a vapor exit temperature of about 30° F. and pressures of approximately 80 to 85 psig. The column is preferably operated at pressures of about 25 to 40 psig and at the corresponding vapor exit temperatures ranging from about 5° to 15° F.

As indicated above, a pool 71 of gasoline is maintained in the bottom of column 60, and liquid is continuously withdrawn from this pool through line 63 for return to the storage tank 10 during loading periods, when gasoline is entering the column through line 61. A liquid level control 66 maintains this pool at a generally constant level through activation of valve 67 in line 63. The unit is preferably sized so that at peak vapor-receiving rates the temperature of the gasoline leaving the absorber volume approaches ambient; for example, gasoline which is supplied at the top of the column at 10° F. is warmed to about 60° to 65° F. in its passage downwardly through the column. At less than maximum vapor-receiving rates, the flow of gasoline to the top of the absorber column is cut back by means of a temperature control instrument 68 which senses the presence of unduly low temperatures and acts to partially close valve 69 in line 61, thereby cutting down the flow of refrigerated gasoline as well as effecting any necessary change in the speed of pump 33. This reduces the operating costs of the system.

It has been found that by starting with a supply of approximately 3,000 gallons of gasoline in the cold storage reservoir at 10° F., and by pumping refrigerated gasoline therefrom to the condensation column (operated at 30 psig) at a rate of 85 gallons per minute (gpm) and to the compressor at a rate of 25 gpm, it is possible to load tank 16 with gasoline for fifty minutes at a peak rate of 5,000 gpm while still maintaining the hydrocarbon content of the vapors discharged through vent 65 at a level of approximately 7 percent by weight. In such an operation, liquid from column 60 at 60° F. would be discharged through line 63 at a rate of approximately 118 gpm. This reflects an increment of 8 gpm of gasoline recovered from the vapors as a result of vapor condensation and absorption taking place in column 60.

Possible difficulties due to the formation of ice crystals in the portion of the system subjected to refrigeration can be overcome by the addition to the gasoline passing through line 40 of an effective amount of an anti-freeze agent.

While this invention has been described in conjunction with preferred embodiments thereof, it is obvious that many modifications and changes therein can be made by those skilled in the art without departing from the spirit and scope of this invention as defined by the claims appended hereto.

I claim:

1. A method of recovering condensable vapors from a mixture of condensable and inert vapors discharged from tanks being loaded with a volatile liquid similar to the condensable vapors, said method comprising collecting said mixture of vapors; saturating the collected vapor mixture with the vapors of said volatile liquid by contacting said mixture with a first refrigerated stream of said liquid; compressing the saturated vapor mixture in the presence of said refrigerated stream; contacting the compressed saturated vapor mixture under elevated pressure in a condensation zone with a second refrigerated stream of the volatile liquid whereby the condensable vapors are taken up by said stream; and recovering the resulting augmented liquid stream from the condensation zone.

2. The method as recited in claim 1 wherein the liquid being loaded is a hydrocarbon fuel, wherein the temperature of the first and second refrigerated streams is about 5° to 15° F, and wherein the pressure maintained in the condensation zone is about 25 to 85 p.s.i.g. so as to convert to liquid at least 90 percent of the hydrocarbon content of the collected vapors.

3. The method as recited in claim 2 which includes the steps of maintaining a reserve of the volatile liquid in a refrigerated condition and in such volume as to permit vapors to be collected at peak tank-loading rates for an extended period of time.

4. The method as recited in claim 1 wherein the collected vapor mixture is simultaneously compressed and saturated by passing the same to a compressor along with the first refrigerated stream.

5. The method as recited in claim 4 wherein the liquid stream to the compressor is a refrigerated one.

6. Apparatus for recovering vapors from a receiving tank into which a volatile liquid is introduced, including means for collecting vapors displaced from the receiving tank, a vapor saturator and saturated vapor compressor in flow communication from said collecting means, refrigeration means, including a reservoir vessel, for maintaining a refrigerated supply of the volatile liquid in said vessel, a volatile liquid supply tank in flow communication with said receiving tank and said reservoir vessel, together with means for flowing the liquid from the supply tank into the receiving tank and reservoir vessel, a vapor condensation column in flow communication from the compressor and from the reservoir vessel as well as with the supply tank, said column being adapted to condense incoming vapors from the compressor by contacting the same under elevated pressure with incoming refrigerated liquid from the reservoir vessel and to discharge liquid introduced into the column, along with the condensate, to the supply tank while venting uncondensed vapors to the atmosphere, and means for flowing refrigerated volatile liquid from the reservoir vessel to the condensation column.

7. The apparatus of claim 6 wherein the reservoir vessel is also in flow communication with the compressor and which includes means for flowing refrigerated volatile liquid from said vessel to the compressor.

* * * * *